US010781867B2

(12) United States Patent
Reimnitz

(10) Patent No.: US 10,781,867 B2
(45) Date of Patent: Sep. 22, 2020

(54) HYBRID MODULE COMPRISING A DISCONNECT CLUTCH AND A MAIN CLUTCH AND ACTUATING SYSTEM ARRANGED THEREBETWEEN

(71) Applicant: Schaeffler Technologies AG & Co. KG, Herzogenaurach (DE)

(72) Inventor: Dirk Reimnitz, Bühl (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 15/772,737

(22) PCT Filed: Nov. 9, 2016

(86) PCT No.: PCT/DE2016/200506
§ 371 (c)(1),
(2) Date: May 1, 2018

(87) PCT Pub. No.: WO2017/088869
PCT Pub. Date: Jun. 1, 2017

(65) Prior Publication Data
US 2019/0211889 A1 Jul. 11, 2019

(30) Foreign Application Priority Data
Nov. 25, 2015 (DE) .................. 10 2015 223 330

(51) Int. Cl.
*F16D 25/10* (2006.01)
*F16D 25/08* (2006.01)
(Continued)

(52) U.S. Cl.
CPC .............. *F16D 25/10* (2013.01); *B60K 6/387* (2013.01); *B60K 6/405* (2013.01); *F16D 13/385* (2013.01);
(Continued)

(58) Field of Classification Search
CPC ......... B60K 6/00–547; F16D 25/00–14; F16D 13/00–76
See application file for complete search history.

(56) References Cited

U.S. PATENT DOCUMENTS

| 6,354,974 B1 | 3/2002 | Kozarekar |
| 9,193,255 B2 * | 11/2015 | Arnold ..................... B60K 6/36 |
| 2014/0231174 A1 | 8/2014 | Iwase et al. |

FOREIGN PATENT DOCUMENTS

| DE | 3737192 A1 | 7/1988 |
| DE | 4311697 A1 | 10/1994 |

(Continued)

OTHER PUBLICATIONS

International Search Report for PCT/DE2016/200506; 2 pgs; dated Feb. 16, 2017 by European Patent Office.

*Primary Examiner* — David R Morris
*Assistant Examiner* — James J Taylor, II
(74) *Attorney, Agent, or Firm* — Kevin L. Parks

(57) ABSTRACT

A hybrid module for a motor vehicle for the coupling of an internal combustion engine includes a separating clutch by means of which the internal combustion engine can be separated from a drivetrain of the motor vehicle and by means of which torque can be imparted to the drivetrain by the internal combustion engine. The hybrid module also has an electric motor which, for torque transmission, is connectable by means of a main clutch to the drivetrain. A separating clutch actuation system is used for effecting an actuation of the separating clutch. A main clutch actuation system is used for effecting an actuation of the main clutch. Both actuation systems are arranged between the separating clutch and the main clutch.

8 Claims, 3 Drawing Sheets

(51) Int. Cl.
*B60K 6/405* (2007.10)
*B60K 6/387* (2007.10)
*F16D 13/38* (2006.01)
*B60K 6/48* (2007.10)

(52) U.S. Cl.
CPC .... *F16D 25/087* (2013.01); *B60K 2006/4825* (2013.01); *F16D 25/083* (2013.01); *Y02T 10/6221* (2013.01); *Y02T 10/6252* (2013.01)

(56) References Cited

FOREIGN PATENT DOCUMENTS

| | | |
|---|---|---|
| DE | 10018926 A1 | 11/2000 |
| DE | 102011100256 A1 | 10/2012 |
| DE | 112012000391 T5 | 10/2013 |
| DE | 102013006429 A1 | 10/2014 |
| DE | 112012000391 T5 | 3/2016 |
| DE | 102016206217 A1 | 10/2016 |
| FR | 2814121 | 3/2002 |
| FR | 3005905 A1 | 11/2014 |
| JP | H1014171 A | 1/1998 |
| JP | 2006306325 A | 11/2006 |
| JP | 2010006190 A | 1/2010 |
| JP | 2013029199 A | 2/2013 |
| JP | 2015174561 A | 10/2015 |
| JP | 2016033003 A | 3/2016 |
| WO | 2012149922 A1 | 11/2012 |
| WO | 2015149804 A1 | 10/2015 |
| WO | 2016169562 A1 | 10/2016 |
| WO | WO-2017012777 A1 * 1/2017 ............. B60K 6/365 |

* cited by examiner

HYBRID MODULE COMPRISING A DISCONNECT CLUTCH AND A MAIN CLUTCH AND ACTUATING SYSTEM ARRANGED THEREBETWEEN

CROSS-REFERENCE TO RELATED APPLICATIONS

This application is the United States National Phase of PCT Appln. No. PCT/DE2016/200506 filed Nov. 9, 2016, which claims priority to German Application No. DE102015223330.8 filed Nov. 25, 2015, the entire disclosures of which are incorporated by reference herein.

TECHNICAL FIELD

The present disclosure relates to a hybrid module for a motor vehicle such as a passenger motor vehicle, a heavy goods vehicle or another commercial vehicle for coupling to an internal combustion engine. The hybrid module includes a disconnect clutch by means of which the internal combustion engine can be disconnected from a (downstream) drive train of the motor vehicle and by means of which torque can be supplied from the internal combustion engine to the drive train, and an electric motor that is connectable or connected to the drive train via a main clutch for torque transmission, wherein a disconnect clutch actuating system is used to actuate the disconnect clutch and a main clutch actuating system is used to actuate the main clutch. In particular, the torque can be transferred (in series) from the internal combustion engine to the drive train via the disconnect clutch and the main clutch.

BACKGROUND

Hybrid modules of this kind are already known from the state of the art, for example from WO 2012/149922 A1. In this particular case, a torque-transmission device for a drive train of a passenger motor vehicle is disclosed. This drive train has two main engines, one of these main engines being an electromechanical energy converter. In this case, this torque transmission device is inserted into a rotor recess which is arranged in a rotor mechanism of this electromechanical energy converter.

Dual clutches which are used in hybrid modules are also known in the art. Hence, for example, PCT/DE2015/200242 discloses a dual clutch for coupling a drive shaft of a motor vehicle engine to a first transmission input shaft and/or to a second transmission input shaft of a motor vehicle transmission. This document discloses that a first partial clutch is used for coupling the drive shaft to the first transmission input shaft. The first partial clutch has a first counterplate, a first intermediate plate that can be axially displaced in relation to the first counterplate, and a first pressure plate for pressing first friction linings of a first clutch disk between the first counterplate and the first intermediate plate and between the first intermediate plate and the first pressure plate, which first pressure plate can be axially displaced in relation to the first counterplate. In addition, it is disclosed that a second partial clutch is used, namely coupling the drive shaft to the second transmission input shaft. The second partial clutch has a second counterplate, a second intermediate plate that can be displaced axially in relation to the second counterplate, and a second pressure plate for pressing second friction linings of a second clutch plate between the second counterplate and the second intermediate plate and also between the second intermediate plate and the second pressure plate, which second pressure plate can be displaced axially in relation to the second counter plate and to the second intermediate plate. A clutch cover for covering at least part of the first partial clutch and/or of the second partial clutch is used, which clutch cover is connected to the first counterplate and the second counterplate in a rotationally fixed manner. First lever elements for displacing the first pressure plate are pivotably supported on the clutch cover and second lever elements for displacing the second pressure plate are pivotably supported on the clutch cover. The aforementioned publication also introduces a so-called "five-plate design", "six-plate design" and "seven-plate design", as well as an "eight-plate design".

A modular drive train design is also known from an earlier application by the Applicant, namely DE 10 2015 207 470 A1. So, for example, this publication discloses a system made up of a dual clutch and a plurality of interface components interacting therewith. The interface components are designed firstly for the transmission of torque to the dual clutch or away from the dual clutch or, secondly, for bringing about an actuating movement of, moreover, for mounting/securing, wherein at least a partial clutch of the dual clutch is designed according to a first variant, namely in the manner of a multi-disk clutch with a first number of friction plates or in a second manner, namely with a second number differing from the first number of friction disks, in the manner of a single-disk clutch, for example, wherein a notable feature is that when a partial clutch of the one kind is used, at least one interface component is designed and positioned for the use of partial clutches of the other kind.

The present disclosure is therefore used in the field of clutches for hybrid vehicles. Modular directly controlled (MDD) clutches, in particular dual clutches, have proved successful in practice. However, clutches of this kind are open to further development. They need to be particularly cost-efficient and to put the available installation space to particularly good use. In addition, the disadvantages known from the state of the art need to be removed or at least mitigated. In other words, a compact hybrid module with a small number of components has to be developed. Individual components which are separate from one another and are normally required for the function of the main components of a disconnect clutch and a dual clutch operatively associated with an electric motor are to be combined.

BRIEF SUMMARY

A generic hybrid module includes two actuating systems arranged between the disconnect clutch and the main clutch, viewed in an axial direction. In this way, components for a plurality of main components are used together or similar components are combined to create new subassemblies which can therefore be produced and/or installed more easily.

The basic design of the proposed hybrid system with a hybrid module therefore involves the disconnect clutch and the MDD clutch being arranged on the opposite axial sides of the electric motor and/or one or both clutches being arranged on the two opposite sides radially within/below the electric motor. All three actuating systems for the clutches of the hybrid modules are arranged in the immediate proximity of one another or even combined in a common subassembly. There is a bearing point on which the rotor of the electric motor is mounted jointly with the dual clutch. By means of this bearing point, the rotor of the electric motor and the dual clutch are supported using a joint bearing support, for example on the clutch housing. The bearing support and the actuating systems may create a joint subassembly.

The bearing support in this case may be fixed relative to the housing, connected in a rotationally fixed manner to a housing part or a clutch housing, clutch bell housing or transmission housing, for example.

Advantageous embodiments are claimed in the dependent claims and are explained in greater detail below.

Hence, it is advantageous for the main clutch to be designed as a single clutch or as a dual clutch (with two partial clutches). Torque transmission free from tractive force interruption can be achieved when using dual clutches, something that is desirable.

The number of components can be drastically reduced when the two actuating systems are integrated in a joint bearing support of integral design, for example.

It is also advantageous for an intermediate shaft to be mounted on the bearing support using plain or anti-friction bearings. The intermediate shaft is a shaft which, when the main clutch is positioned in such a manner that no torque is transferred from the electric motor and/or the internal combustion engine to a transmission input shaft, for example to an inner transmission shaft or an outer transmission shaft, is mounted in a rotationally movable manner in relation to the transmission shaft. The bearing support in this case is connected to the transmission housing, clutch housing or engine block and is therefore capable of supporting and bearing the intermediate shaft. A needs-based uncoupling of the individual components is then effectively realizable.

If the disconnect clutch actuating system and/or the main clutch actuating system is configured as a hydraulic system, a hydrostatic system, a pneumatic system, an electromechanical system or a (purely) mechanical system, for example a lever-activated system, easily actuated and/or fail-proof components can be utilized.

Depending on which kind of (main/disconnect) clutch actuating system is deployed, a flexible supply of hydraulic fluid, such as oil, can be used or a supply of hydraulic fluid can be dispensed with by using a pneumatic, mechanical or electrical energy supply, for example. The clutch actuating systems may be combined with energy stores, e.g. plate springs or force-transmission elements, e.g. levers. The costs and service life can then be set as desired.

It has proved particularly successful for the disconnect clutch actuating system and/or the main clutch actuating system to include one or more Concentric Slave Cylinders (CSCs). A simple attachment to secondary actuators can then be achieved. The use of mechanical and/or electromechanical actuators, e.g. EZA, is also appropriate.

It is also advantageous for the CSC of the disconnect clutch actuating system to have a disconnect clutch piston that can be moved/shifted/axially displaced from the bearing support in the direction of the internal combustion engine and/or for at least one of the CSCs of the main clutch actuating system to have a main clutch piston that can be moved/shifted/axially displaced from the (same) bearing support in the direction of the transmission or for both CSCs of the main clutch actuating system each to have a main clutch piston of this kind that can be displaced in the direction of the transmission.

It is advantageous for the intermediate shaft to be radially and/or axially supported/mounted wherever possible by means of one bearing support anti-friction bearing or one bearing support plain bearing. A joint support can then be selected both for the rotor and for the main clutch.

It is also advantageous for a joint bearing point to be formed on the joint bearing support which axially and/or radially supports the intermediate shaft, a rotor of the electric motor, the main clutch/a clutch bell housing of the main clutch and/or the disconnect clutch/a pressure plate or clutch bell housing of the disconnect clutch in a rotationally movable manner (in relation to a clutch housing). In this way, the number of bearings to be used can be reduced substantially.

It is advantageous in this case for the bearing support anti-friction bearing to have such a great axial length that any tilting of the bearing support is prevented. The bearing support anti-friction bearing or bearing support plain bearing may include a plurality of individual bearings which can support radial and/or axial forces.

In order to achieve a particularly long-lasting kind of connection, it is advantageous for a clutch bell casing of the main clutch, to which one or two counterplates is/are secured, for example, to be fastened to the intermediate shaft in a form-fitting, force-fitting and/or substance-bonded manner.

If there is a torque-transmitting, non-detachable connection, for example a welded connection, between an integral intermediate shaft flange of the intermediate shaft and of the clutch bell housing, which intermediate shaft flange projects at least sectionally in the radial direction, a particularly compact design can be realized, for example.

It is also advantageous in this case for a rotor of the electric motor to be attached in a rotationally fixed manner on the intermediate shaft flange, as the number of components is thereby reduced.

In order to prevent intricate contacts, it is advantageous for the rotor to have a permanent magnet.

It has also proved successful for the main clutch and/or the disconnect clutch to be configured as a multi-disk clutch, in other words to have at least one intermediate plate between at least two clutch disks. The clutch disks and the at least one intermediate plate can be clamped by a particular pressure plate and a particular counter-pressure plate. Due to its function, the intermediate plate belongs more to the pressure plates and the counter-plates, as it is connected to them in a rotationally fixed manner. The particular features of PCT/DE 2015/200242 and of DE 10 2015 207 470 A1 are to be regarded as integrated here in this respect.

For assembly purposes, it is also beneficial for the disconnect clutch and the main clutch to be arranged at opposite ends of the electric motor. Although hybrid modules which allow a connection of a transmission input shaft either to an electric motor or to an internal combustion engine, as selected, are already known in the art an improvement is identified here. The disconnect clutch is to be arranged further radially within the electric motor.

The present disclosure proposes a system including a hybrid module with a disconnect clutch and a dual clutch for a dual clutch transmission. The actuating elements for both clutch assemblies are arranged in a joint bearing support within the electric machine. The bearing support may be connected to the clutch housing or may be an integral component of the clutch housing and/or of a special housing for the E-motor and/or the entire hybrid module.

The axial sequence is: crankshaft, disconnect clutch (on intermediate shaft), actuating elements (which support the intermediate shaft) and dual clutch. The dual clutch is mounted on the intermediate shaft. The disconnect clutch may rest on the crankshaft or the intermediate shaft.

The actuating forces of the total actuating elements may be introduced into the clutch housing in a first alternative via the crankshaft and in a second alternative via a bearing of the disconnect clutch via the intermediate shaft and the bearing support.

The intermediate shaft may include the rotor support as an integral element. The bearing support includes (in one part or multiple parts) a cylinder for short pistons and the supply of hydraulic fluid for the actuation thereof. The two clutches may also be arranged radially within the rotor.

The dual clutch may be an MDD clutch, as is already known from DE 10 2015 207 470 A1. Alternatively, it may also be lever-actuated, as is disclosed in PCT/DE 2015/200242. It may, accordingly, have multiple or only one friction disk per clutch. Dual clutches with a plurality of disks per partial clutch have the particular advantage that they are radially smaller in design and can therefore be interlaced within the rotor. The focus, therefore, is that a subassembly of actuator components is provided which is configured as a joint subassembly. The present disclosure falls within the field of electromobility and is based on a direct multi-disk dual clutch.

BRIEF DESCRIPTION OF THE DRAWINGS

The present disclosure is explained in greater detail below with the help of a drawing. In this case, three different exemplary embodiments of the present disclosure are presented. In the drawings.

DETAILED DESCRIPTION

The figures are purely schematic in nature and are only used for the purpose of understanding the present disclosure. The same elements are provided with the same reference numbers. Elements of the individual exemplary embodiments may also be inserted into the other exemplary embodiments, which makes them interchangeable with one another.

Figure 1:
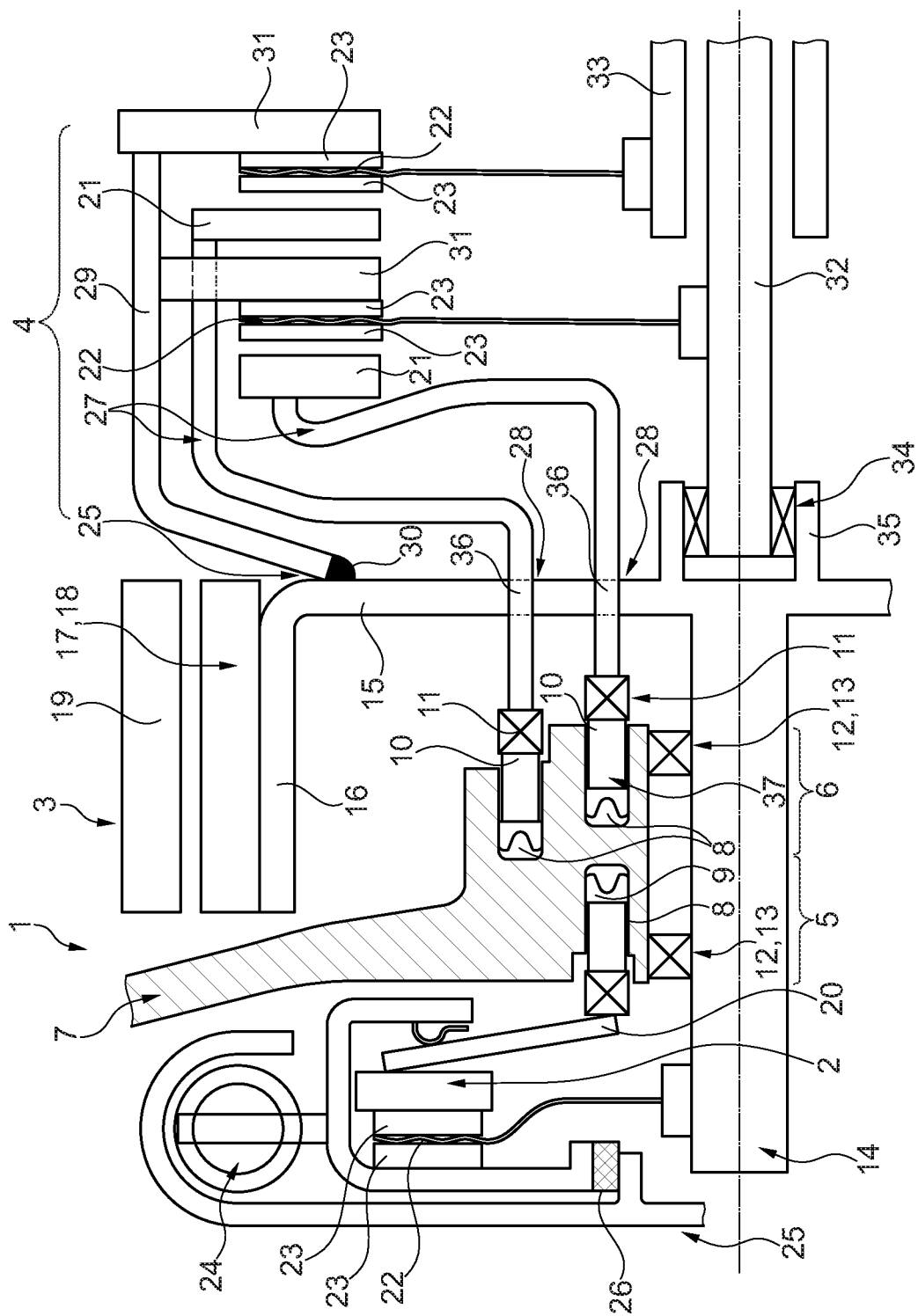
FIG. 1 shows part of a longitudinal section of a hybrid module according to the present disclosure.

A first embodiment of a hybrid module 1 according to the present disclosure is depicted in FIG. 1. The hybrid module 1 is inserted between an internal combustion engine which is not shown and a transmission which is not shown. The transmission is, however, provided/prepared for coupling to this internal combustion engine/conveying torque from the internal combustion engine.

A disconnect clutch 2, among other things, is available for this. This disconnect clutch 2 is also referred to as a K0 clutch. Via the disconnect clutch 2, torque is selectively transferred in the direction of a drive train, i.e. during actuation of the disconnect clutch 2, or—in another embodiment of the disconnect clutch 2—the torque flow is interrupted.

Between the disconnect clutch 2 and the transmission, which is not shown, is arranged an electric motor 3 which can be used as an electric machine. The electric motor may also be described in abbreviated form as an E-motor.

There is also a main clutch 4 between the electric motor 3 and the transmission.

There is an actuating system, namely a disconnect clutch actuating system 5, for the disconnect clutch 2. In addition, there is an actuating system, namely a main clutch actuating system 6, for the main clutch 4. The two actuating systems 5 and 6 are integrated in a joint bearing support 7. The bearing support 7 in this case is fixedly connected to a portion/housing fixed relative to the vehicle chassis in the form of a clutch housing 41. Alternatively or in addition, the housing may also be configured as a transmission housing, a housing of the internal combustion engine and/or an electric motor housing. The (joint) bearing support 7 has extendable spaces 8 (cylinders) in which either one disconnect clutch piston 9 or one or two main clutch pistons 10 are arranged in an axially displaceable manner. The main clutch pistons 10 then travel diametrically in the other direction to the disconnect clutch piston 9. The disconnect clutch pistons 9 or the main clutch pistons are supported by actuating bearings 11.

The intermediate shaft 14 is radially supported via a joint bearing point 12 in the region of a bearing support anti-friction bearing 13 on a bearing support 7. An integral intermediate shaft flange 15 is present on the intermediate shaft 14. The intermediate shaft flange 15 has a support portion 16. The intermediate shaft flange 15 is (precisely) oriented in the radial direction, whereas the support portion 16 is (precisely) oriented in the axial direction. The intermediate shaft flange 15 and the support portion 16 also extend in the peripheral direction and may exhibit interruptions, e.g. for punch-throughs of the pressure pots 27 or the pressure pot extensions 36 thereof.

On the support portion 16, namely on the radial outer side thereof, particularly the outer circumferential surface thereof, a rotor 17 is attached. The rotor 17 may have a permanent magnet 18. A stator 19 interacting therewith is indicated radially outside it.

Figure 2:
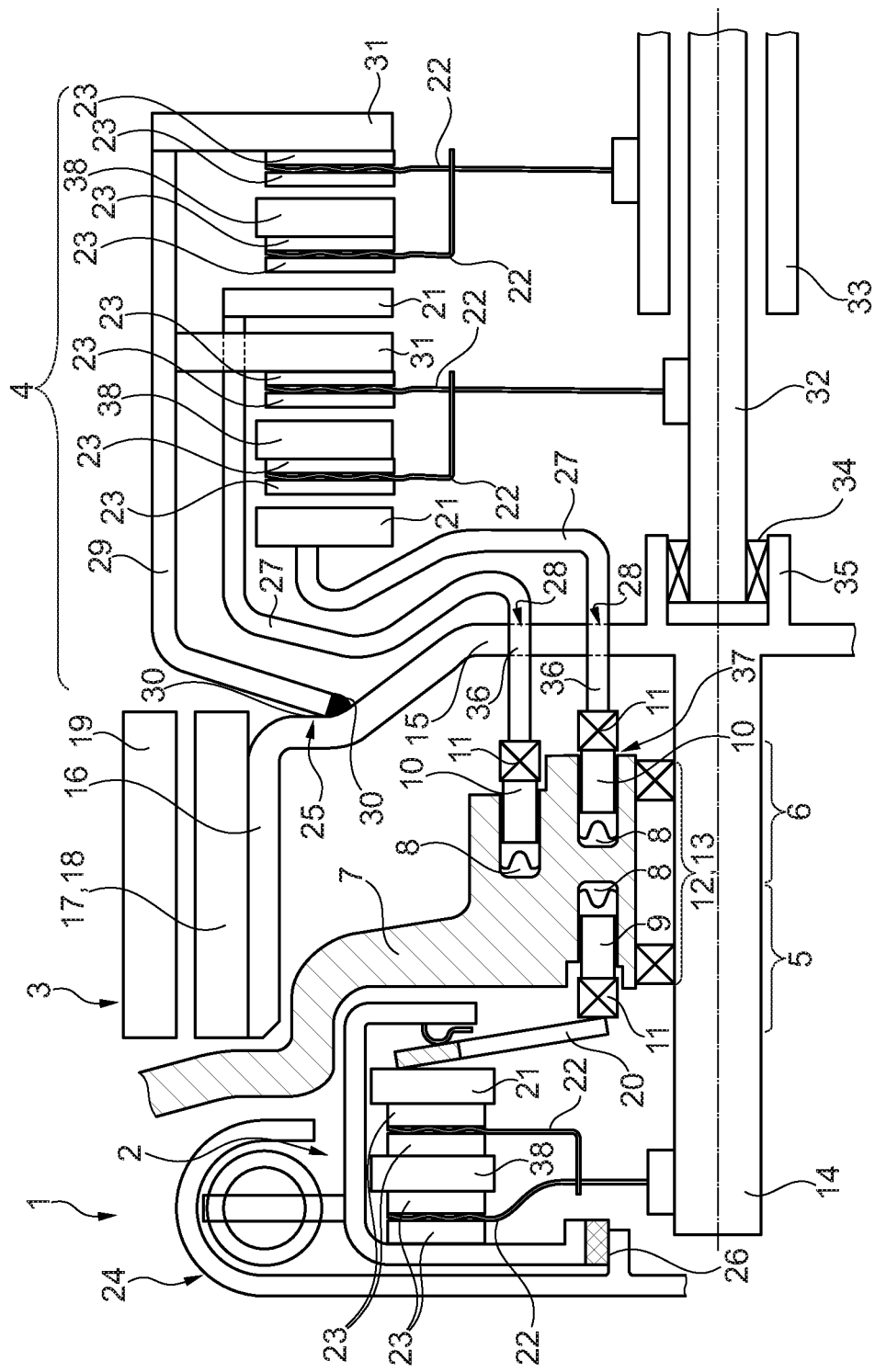
FIG. 2 shows a second exemplary embodiment in a presentation format similar to FIG. 1, wherein the dual clutch includes two (partial) multi-disk clutches.
Figure 3:
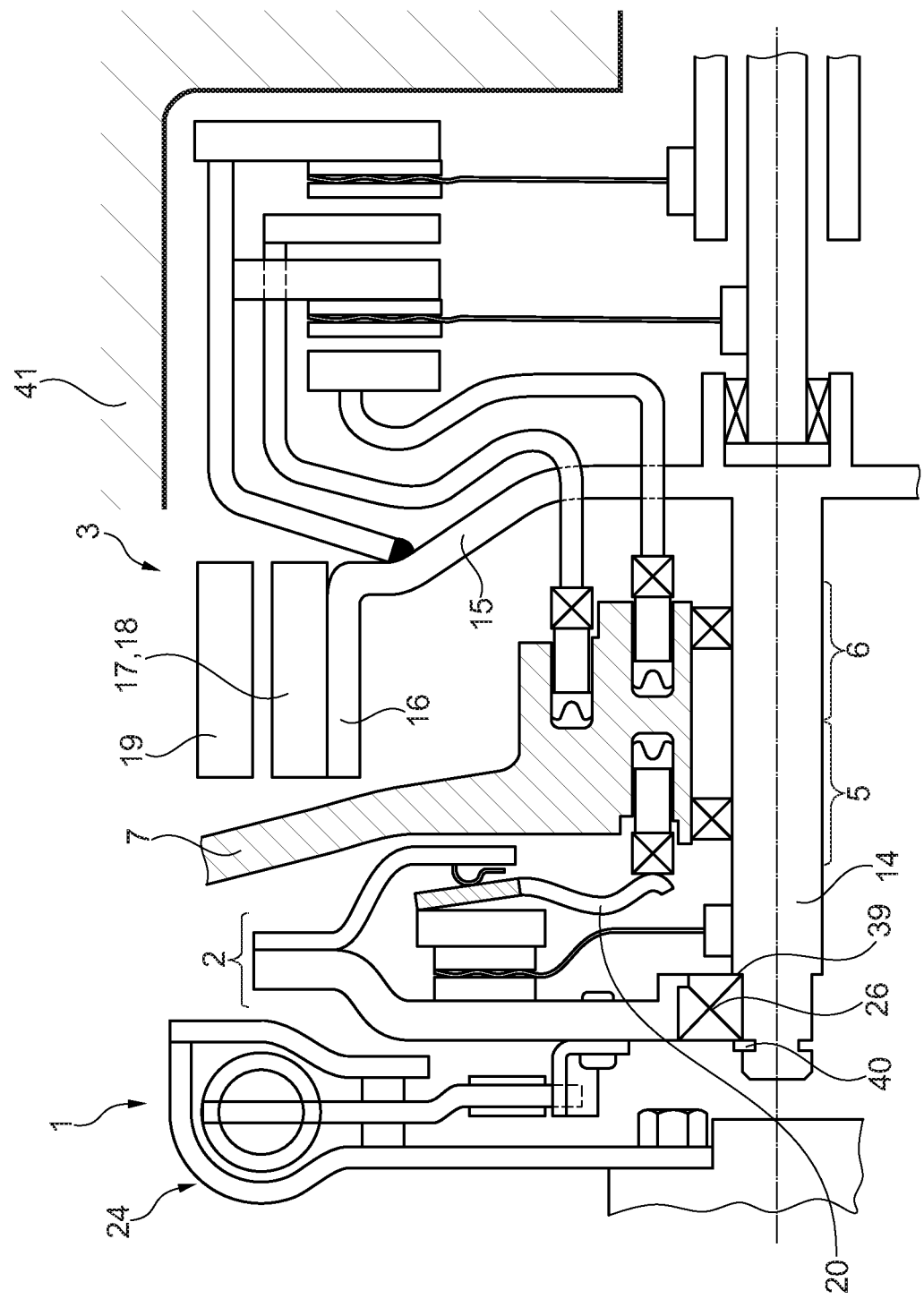
FIG. 3 shows a third exemplary embodiment in a presentation format similar to FIG. 1 in which, however, unlike in the first exemplary embodiment, the disconnect clutch is not supported on a dual mass flywheel, as it can be expected with this design that no significant axial forces will be transmitted via the crankshaft.

In the unactuated state, the lever element 20 (in the form of a plate spring) of the disconnect clutch 2 exerts force on the pressure plate 21, so that the clutch plate 22 is clamped with friction linings 23 attached thereto between the pressure plate 21 and the counterplate/intermediate plate 38 for the purpose of torque transmission. In order to open the disconnect clutch 2, the actuating bearing 11 activated by the disconnect clutch piston 9 presses on a lever element 20 (e.g. plate spring tongues) in order to overcome the force of the plate spring and relieve the clutch disk 22. The clutch disk 22 is permanently attached in a torque-transmitting manner to the intermediate shaft 14, but mounted there in an axially displaceable manner. FIGS. 1 to 3 show disconnect clutches 2 pressed open (normally closed). A disconnect clutch 2 pressed closed (normally open) is of course also technically realized in other embodiments.

A dual mass flywheel (ZMS) 24 has a connection point 25 for attachment to a crankshaft, for example, for the transmission of torque from the internal combustion engine. A bearing 26 by means of which the disconnect clutch 2 is supported radially and axially rests on the dual mass flywheel 24.

The components that can be actuated by the main clutch pistons 10 are configured as pressure pots 27 which are conducted through windows 28 in the intermediate shaft flange 15.

A clutch bell housing 29 is also fastened to the intermediate shaft flange 15, namely welded to a weld seam 30. The clutch bell housing 29 may also be referred to as a cover or driver ring.

The main clutch 4 is designed as a dual clutch. For this purpose, a mechanical, electromechanical, hydrostatic, pneumatic or hydraulic actuation can be realized and used in principle.

Two counterplates 31 are fastened to the clutch bell housing 29. The clutch plate 22 that can be clamped between a pressure plate 21 and the counterplate 31 is attached in a rotationally fixed but axially displaceable manner to either an inner transmission input shaft 32 or an outer transmission input shaft 33. The inner transmission input shaft 32 is mounted by means of a pilot bearing 34 on a flange 35 of the intermediate shaft 14. Web-like pressure pot extensions 36 engage through the windows 28 radially outside this. The main clutch actuation system 6 in this embodiment includes at least one CSC 37.

A first clutch, namely the disconnect clutch 2, via which the torque from the internal combustion engine/the motor can be introduced into the intermediate shaft 14 is therefore arranged on the internal combustion engine. In order to reduce rotational irregularities, in this exemplary embodiment the dual mass flywheel (ZMS) 24 is arranged between the internal combustion engine and the disconnect clutch 2. The disconnect clutch 2 may be designed as a pressed-closed and as a pressed-open clutch, although it is particularly appropriate for a pressed-open clutch to be used, as this involves smaller actuating forces.

The intermediate shaft 14 is not only connected to the disconnect clutch 2, but also to the rotor 17 of the electric machine/electric motor 3 and to the dual clutch (main clutch). It is particularly advisable in this case for the rotor 17 of the electric machine/electric motor 3 and the dual clutch to be rigidly connected to the intermediate shaft 14, so that not only can torque be transmitted between the components, but the rotor 17 with the dual clutch can also be mounted, centered and supported via the intermediate shaft 14. It is thereby possible for the clutch plate 22 of the disconnect clutch 2, the intermediate shaft 14, the rotor 17 of the electric motor 3 and the dual clutch to be supported on a common bearing base. This reduces the number of bearing points significantly compared with other designs and, as a result, leads to a compact and reasonably priced hybrid module 1.

So that this central bearing point 12 can be designed with sufficient robustness and accuracy for the mounting of the rotor 17, a wide bearing base is recommended, for example with a fixed bearing/loose bearing combination or two tensioned angular ball bearings 13. The wide bearing base and the robust attachment to a housing fixed relative to a vehicle chassis in the form of a clutch housing 41 (FIG. 3) or a hybrid module housing is made possible in the exemplary embodiment by a bearing support 7 which extends radially outwards from the bearing point on the intermediate shaft 14, namely between the dual mass flywheel 24 and the electric motor 3. The clutch actuating systems for the three clutches, in other words the disconnect clutch 2 and the two partial clutches of the main clutch 4 designed as a dual clutch, can be integrated in the bearing support 7 or entirely or partly fastened thereto. The main clutch 4 may also be designed as an individual clutch, in other words as a single clutch. If the actuating systems 5 and/or 6 are designed as CSCs, the (respective/joint) CSC housing can merge integrally with the bearing support for this purpose or a joint subassembly between the bearing support 7 and the CSCs can be formed.

The hydraulic lines for the CSCs may likewise be integrated in the bearing support 7 or the bearing support 7 may exhibit recesses, so that the lines can be guided through in the most space-saving manner possible between the ZMS 24 and the disconnect clutch 2 on the one side and the electric motor 3 on the other side.

The radially inwardly arranged intermediate shaft 14 is connected to the radially outwardly arranged rotor 17 and the dual clutch is connected via a rigid, perforated, disk-shaped component or via spikes. The intermediate shaft 14, the intermediate shaft flange 15 designed as a rigid, perforated, disk-shaped component or as spokes, for example, and the support portion 16 may be configured integrally or as multiple parts.

Web-like pressure pot extensions 36 or axially displaceable pins or webs that can interact with the pressure pots 27 of the dual clutch project through these holes or intermediate spoke spaces distributed around the circumference. In this way, the force of the vertical clutch actuating systems can be transferred from the actuating bearing 11 onto the rotating system of the hybrid module 1 and then through the passages onto the dual clutch.

It is therefore possible to shift back and forth between the driving states "Driving with the internal combustion engine" and "Driving with the electric motor" and these can be combined. For the "Driving with the internal combustion engine" state, when the disconnect clutch 2 is engaged the engine torque is transmitted to the intermediate shaft 14 and from there via the dual clutch into the inner or outer transmission input shaft 32 or 33. Since the electric motor 3 co-rotates during driving with the internal combustion engine, this may, where appropriate, also co-rotate as a generator or support the internal combustion engine in so-called "boost mode", for example.

For driving with the electric motor 3 it is then easily adjustable, when the disconnect clutch 2 is disengaged, to uncouple the internal combustion engine from the hybrid module 1 completely, so that the internal combustion engine can be switched off. The vehicle is then driven (exclusively) via the electric motor 3 which drives the dual clutch and transmits torque via this to the inner or outer transmission input shaft 32 or 33.

In the second exemplary embodiment depicted in FIG. 2, a fundamentally similar design to the exemplary embodiment in FIG. 1 is shown, wherein, however, in the second exemplary embodiment intermediate plates 38 are used. In this way, a so-called "multi-disk dual clutch" can be realized in the region of the main clutch 4. This allows the transmission of high torques with comparatively low actuating forces and/or a small diameter.

If the electric motor 3 is axially even wider, this multi-disk design also offers the possibility of the dual clutch having such small radial dimensions that it can be arranged at least partially radially below/in the electric motor 3.

The disconnect clutch 2 may of course also be arranged completely or partially radially below the electric motor 3. The offset of the bearing support 7 required for this is indicated in FIG. 2. In the exemplary embodiment shown, the disconnect clutch 2 is also configured as a dual-plate clutch. Depending on the particular application, all clutches 2 and 4 of the hybrid module 1 may exhibit many disks/intermediate plates 38.

A third exemplary embodiment is depicted in FIG. 3 which differs from the exemplary embodiment shown in FIG. 1 in that the bearing 26 is fixed on the intermediate shaft 14 and rests on a shoulder 39 of the intermediate shaft 14 and the securing ring 40. Of course in this case, even though it is not shown, the use of further intermediate plates 38 is likewise possible, as shown in the exemplary embodiment in FIG. 2.

So that the actuating forces of the disconnect clutch 2 need not (ultimately) be supported via a crankshaft, as is the case in the exemplary embodiments 1 and 2, FIG. 3 shows a disconnect clutch 2 which is mounted on the intermediate shaft 14.

In this exemplary embodiment, the primary side of the torsional vibration damper is secured to the crankshaft. The flange of a damper (on a secondary side) is connected via a spline to the counterplate of the disconnect clutch 2 mounted on the intermediate shaft 14. The axial actuating forces of the disconnect clutch 2 may therefore be introduced via the special support bearing into the intermediate shaft 14, whence they are deflected via the intermediate shaft bearing and the bearing support 7 into the clutch housing 41 or the hybrid system housing.

LIST OF REFERENCE NUMERALS

1 Hybrid module
2 Disconnect clutch
3 Electric motor
4 Main clutch
5 Disconnect clutch actuation system
6 Main clutch actuation system
7 Bearing support
8 Extendable space
9 Disconnect clutch piston
10 Main clutch piston
11 Actuating bearing
12 Joint bearing point
13 Bearing support anti-friction bearing
14 Intermediate shaft
15 Intermediate shaft flange
16 Support portion
17 Rotor
18 Permanent magnet
19 Stator
20 Lever element
21 Pressure plate
22 Clutch disk
23 Friction lining
24 Dual mass flywheel
25 Connection point
26 Bearing
27 Pressure pot
28 Window
29 Clutch bell housing
30 Weld seam
31 Counterplate
32 Inner transmission input shaft
33 Outer transmission input shaft
34 Pilot bearing
35 Flange
36 Web-shaped pressure pot extension
37 CSC
38 Intermediate plate
39 Shoulder
40 Securing ring
41 Clutch housing

The invention claimed is:

1. A hybrid module for a motor vehicle comprising:
a common bearing carrier formed from a single piece of material;
a separating clutch for separating an internal combustion engine from a drivetrain of the motor vehicle, and for imparting a torque from the internal combustion engine to the drivetrain;
an electric motor comprising a rotor;
a main clutch for connecting the electric motor to the drivetrain for torque transmission;
an intermediate shaft mounted on the common bearing carrier and arranged to be movable relative to a transmission input shaft when the main clutch is in a position in which no torque is imparted to the transmission input shaft by the electric motor or by the internal combustion engine, the intermediate shaft comprising:
an integral intermediate shaft flange comprising a window;
a support portion extending from the integral intermediate shaft flange and including an outer circumferential surface to which the rotor is attached; and
a second flange;
a separating clutch actuation system for actuating the separating clutch, the separating clutch actuation system being arranged between the separating clutch and the main clutch and integrated in the common bearing carrier;
a main clutch actuation system for actuating the main clutch, the main clutch actuation system being arranged between the separating clutch and the main clutch and integrated in the common bearing carrier, and comprising a pressure pot with a pressure pot extension extending through the window; and
a pilot bearing installed in the second flange for mounting the transmission input shaft.

2. The hybrid module according to claim 1, characterized in that the main clutch is formed as a dual clutch.

3. The hybrid module according to claim 1, characterized in that the separating clutch actuation system or the main clutch actuation system is formed as a hydraulic, hydrostatic, pneumatic, electromechanical or mechanical system.

4. The hybrid module according to claim 3, characterized in that the separating clutch actuation system or the main clutch actuation system comprises one or more concentric slave cylinders.

5. The hybrid module according to claim 1, characterized in that the common bearing carrier radially or axially supports the intermediate shaft by one bearing carrier rolling bearing or one bearing carrier plain bearing.

6. The hybrid module according to claim 1, characterized in that a common bearing position is formed on the common bearing carrier, which the common bearing position bears the intermediate shaft, the rotor, the main clutch or the separating clutch in a rotationally movable manner.

7. The hybrid module according to claim 1, characterized in that the main clutch or the separating clutch is formed as a multi-disk clutch.

8. A drive arrangement for a motor vehicle comprising the internal combustion engine and the hybrid module according to claim 1, which is connected or connectable to a transmission comprising the transmission input shaft.

* * * * *